United States Patent [19]

Blaushild

[11] Patent Number: 4,664,879
[45] Date of Patent: May 12, 1987

[54] GUIDE TUBE FLOW RESTRICTOR

[75] Inventor: Ronald M. Blaushild, Penn Hills Twp., Pa.

[73] Assignee: Westinghouse Electric Corp., Pittsburgh, Pa.

[21] Appl. No.: 634,727

[22] Filed: Jul. 26, 1984

[51] Int. Cl.$^4$ .............................................. G21C 1/04
[52] U.S. Cl. ..................................... 376/352; 376/399; 138/42
[58] Field of Search .............................. 376/352–353, 376/399, 463; 138/42–43, 44

[56] References Cited

U.S. PATENT DOCUMENTS

| | | | |
|---|---|---|---|
| 3,175,957 | 3/1965 | Costes et al. | 376/352 X |
| 3,389,056 | 6/1968 | Frisch | 376/352 X |
| 3,977,439 | 8/1976 | Lambert | 376/352 X |
| 4,047,837 | 9/1977 | Hueber et al. | 138/42 X |
| 4,050,476 | 9/1977 | Hayner et al. | 138/42 X |
| 4,194,948 | 3/1980 | Ledin | 376/352 X |
| 4,289,291 | 9/1981 | Goddard et al. | 376/352 X |
| 4,348,353 | 9/1982 | Christianson et al. | 376/352 X |
| 4,418,723 | 12/1983 | Koni et al. | 138/42 |
| 4,533,083 | 8/1985 | Tucker | 138/42 X |
| 4,544,099 | 10/1985 | Norris | 138/43 X |

Primary Examiner—Peter A. Nelson
Attorney, Agent, or Firm—Daniel C. Abeles

[57] ABSTRACT

A guide tube flow restrictor for use on an upper guide tube housing support plate of a nuclear reactor, for guiding of a control rod drive shaft through an aperture in the support plate and restriction of flow of coolant therethrough, has an outer ring seatable on the support plate, the outer ring having a flange member from which there depends a plurality of flexible members, the flexible members having inwardly disposed deflectors thereon, and extending through the bore of the outer ring and the aperture of the support plate. An axially insertable sleeve, upon insertion into the outer ring, between the flexible members, contacts the deflectors thereon to radially force the flexible members outwardly to secure the same with the walls of the aperture of the support plate. Baffles are provided on the flexible segments and additional locking members provided between the outer ring and inner sleeve. Shoulders on the outer ring prevent the accumulation of deposits or corrosive affects which could render difficult the disengagement of the outer ring and inner sleeve for replacement thereof.

17 Claims, 4 Drawing Figures

GUIDE TUBE FLOW RESTRICTOR

BACKGROUND OF THE INVENTION

The present invention relates to a guide tube flow restrictor for use in conjunction with drive rod assemblies of a pressurized water nuclear reactor. The guide tube flow restrictor serves both to act as a guide for a drive shaft connected to a control rod and as a flow restrictor for primary coolant passing through the reactor.

In pressurized water nuclear reactors, the reactor head plenum contains a guide assembly for controlling the movement of various components such as control rods. Such an assembly generally contains a top support plate, having apertures therethrough, through which drive mechanisms for control rods pass. A guide assembly is provided that is disposed in the apertures to both guide the control rod drive shaft and control the upward flow of water through the apertures. Conventionally, such assemblies comprise a grommet-like member secured in the aperture by a plurality of flexure elements aligned in parallel relationship with he drive shaft, which flexure elements are mounted in special fittings supported in the top plate. Such conventional assemblies require machining and welding operations for installation of the flexure members and require time-consuming procedures for their replacement.

An improved type of assembly is described in co-pending application Ser. No. 574,839 filed Jan. 30, 1984 in the names of David E. Boyle and James R. Chrise, entitled "Quick Release Guide Sleeve Assembly", which application is assigned to the assignee of the present invention, the contents of said application incorporated herein by reference. In said application, the assembly comprises an outer sleeve, an inner sleeve, and a locking mechanism movably mounted on the outer sleeve for frictionally engaging the wall surfaces about an aperture in a top support plate of a guide tube rod assembly. The assembly described therein still, however, requires the use of a tool for assembly, as well as disassembly. Also, the construction is such that corrosion or accumulation of deposits about the locking mechanism could develop that would lead to difficulties in removal and replacement of such an assembly.

It is an object of the present invention to provide a guide tube flow restrictor that may be assembled without the need for special tools and is readily removable from its position in a support plate.

It is another object of the present invention to provide a guide tube flow restrictor that has a design that simplifies manufacture of such an assembly and is more economical.

It is a further object of the present invention to provide a guide tube flow restrictor that reduces the possibility of corrosion or collection of deposits between the assembly parts in use, such as would cause difficulties in removal or replacement of the assembly.

SUMMARY OF THE INVENTION

A guide tube flow restrictor for use in an upper guide tube support plate comprises an outer ring that is seatable on the support plate, with a bore through the ring aligned with an aperture in the support plate, and an inner sleeve coaxially insertable in the outer ring. The outer ring has a flange member that carries a plurality of downwardly extending flexible segments which extend through the bore and the aperture of the support plate. Upon axial insertion of the inner sleeve into the bore of the outer ring, the sleeve contacts deflecting means on the flexible segments and force the segments radially outwardly to frictionally secure the same with the walls of the aperture of the support plate and lock the assembly in place.

The flexible segments preferably terminate in an outwardly disposed leg portion which contacts the bottom of the wall of the aperture in the support plate and also carry an inwardly protruding baffle to deflect the upflow of water away from the bottom of the inner sleeve, while the deflecting means preferably comprises an inwardly protruding extension having at least one angular strut extending upwardly therefrom to the flexible segment, with contact of the inner sleeve confined to the angular surface of the strut.

Shoulders are provided on the outer ring to prevent accumulation of deposits and corrosive problems, while additional locking means may be provided to positively secure the outer ring and inner sleeve together when assembled.

BRIEF DESCRIPTION OF THE DRAWINGS

The invention is further illustrated by reference to the attached drawings, in which.

DETAILED DESCRIPTION

Figure 1:
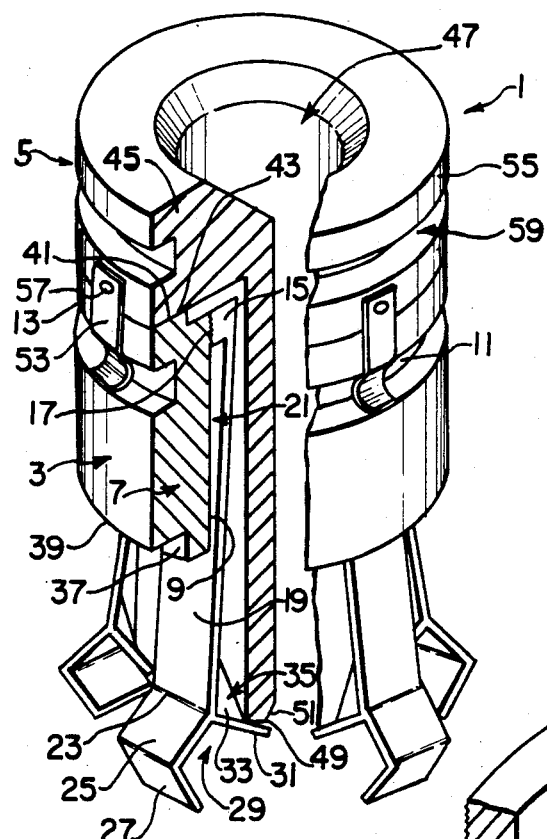
FIG. 1 is a perspective view of the guide tube flow restrictor of the present invention showing the outer ring and inner sleeve assembled together.
Figure 2:
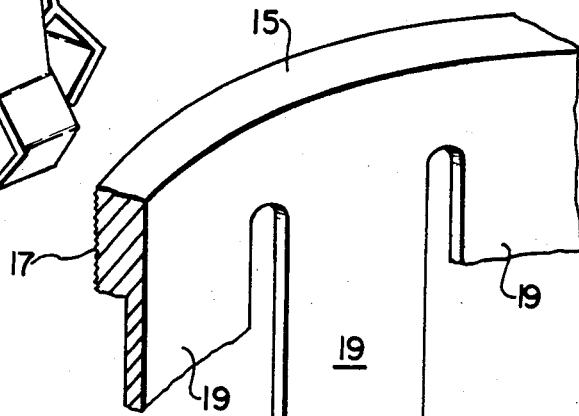
FIG. 2 is a fragmentary view of the flange of the outer ring with a preferred flexible segment shown in detail.
Figure 2:
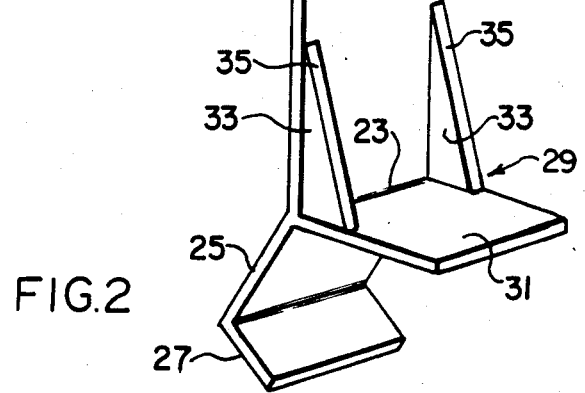

As illustrated in the perspective view of FIG. 1, the guide tube flow restrictor 1 is comprised of an outer ring 3 and an inner sleeve 5. The outer ring 3 has an axial bore 7 through the length of the ring, which forms an inner surface 9 facing the axial bore 7. The outer ring 3 also preferably has a groove 11 about the outer surface 13.

A flange member 15 is provided on the outer ring 3 adjacent the top, the flange member extending inwardly from the inner surface 9. The flange member may be a separate body connected to the outer ring 3 by means of threads 17, or the flange member may be formed as an integral unit with the outer ring 3. A plurality of flexible segments 19, such as leaf springs, are provided about the inner periphery of the flange member 15, which flexible segments extend axially through and outwardly from the bore 7 of the outer ring 3. The flexible segments 19, depending from the flange member 17 are spaced from the inner surface 9 of the outer ring member 3, forming a gap 21 therebetween. Each flexible segment 19 has, at the terminus 23, an outwardly disposed leg portion 25, the leg portion having an inwardly protruding baffle 27. Also, at the terminus 23, each flexible segment 19 has an inwardly disposed deflecting means 29, preferably comprised of an inwardly protruding extension 31, having at least one angular strut 33 thereon extending upwardly to the flexible segment 19. As illustrated, a pair of angular struts 33 may be provided. The angular strut 33 provides an angular surface 35.

The outer ring 3 preferably has a downwardly extending shoulder 37 completely about the inner periphery of the bottom surface 39 of the ring 3, and an upwardly extending shoulder 41 completely about the outer periphery of the top surface 43 thereof.

Concentrically within the outer ring 3 and flange member 15 with flexible segments 19, there is an axially insertable inner sleeve 5. The inner sleeve 5, in a cylindrical shape, has an outwardly extending flange 45 at the top thereof, and a passage 47 therethrough for insertion of a shaft as hereinafter described. The bottom edge 49 of the inner sleeve 5 has beveled inner and outer edges 51. Locking means, such as spring clips 53, attached to the outer surface 55 of the flange 45 by attachment means 57 depend from the flange. Also provided in the outer surface 55 is a channel 59 for cooperation with a tool, not shown.

The guide tube flow restrictor 1 is designed for use with drive shaft mechanisms passing through an upper support plate 61 (FIGS. 3 and 4), having apertures 63, with the bottom of the outer ring 3 resting on the upper surface 65 of the upper support plate 61. A beveled edge 67 is provided on the lower surface 69 of the upper support plate 61 about aperture 63. The position of the guide tube flow restrictor about a drive shaft 71, such as a control rod drive shaft, is shown in FIG. 4.

Figure 3:
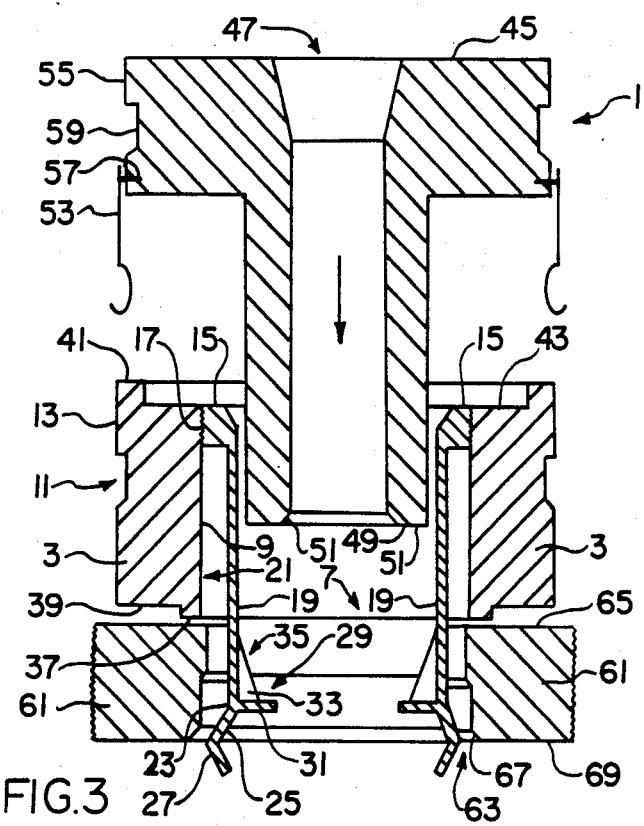
FIG. 3 is a cross-section through a preferred embodiment of the present invention with the inner sleeve being axially inserted into the outer ring.

The assembly of the guide tube flow restrictor is illustrated in FIG. 3. The outer ring 3 is seated on the upper surface 65 of the upper support plate 61 about an aperture 63. The bore 7 and aperture 63 are aligned coaxially, with the shoulder 37 on the bottom surface 39 of the ring 3 flush with the upper surface 65 of support plate 61. In this position, the flexible segments 19 are of a length designed to extend through the aperture 63, with the outwardly extending legs 25 proximate the beveled edges 67 on the bottom surface 69 of the support plate 61 about the aperture 63. The inner sleeve 5 is axially inserted into the bore 7 of the outer ring 3, between the flexible segments 19, in the direction of the arrow shown in FIG. 3. Upon substantially full insertion of the inner sleeve 5 into the bore 7, the bottom wall 49 of the sleeve 5 will contact the deflecting means 29, by contact with the angular surface 35 of struts 33, and complete insertion of the sleeve 5 will radially force the bottom of the segments 19 outwardly, as indicated by the arrows in FIG. 4, until the legs 25 engage the beveled surface 67 on the bottom edge 69 of the support plate 61. The guide tube flow restrictor may thus be assembled and positioned on the support plate without the need for tools.

Figure 4:
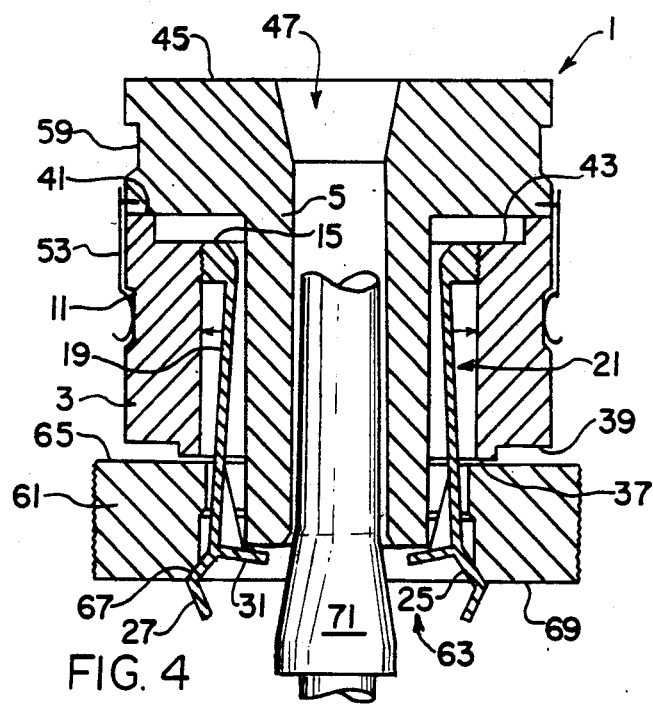
FIG. 4 is a cross-section of the embodiment illustrated in FIG. 3 in assembled, locked position.

The full insertion of the inner sleeve 5 within the outer ring 3 and placement of the guide tube flow restrictor 1 on the upper support plate 61 is illustrated in FIG. 4. In this position, the inner sleeve 5 and outer ring 3 are engaged and frictionally secured on the upper support plate 61. With the legs 25 of the flexible segments 19 contacting beveled edges 67, the guide tube flow restrictor 1 is locked into place. The lower surface of flange 45 of outer ring 3 contacts the shoulder 41 of the inner sleeve 5. In order to protect the outer ring from excessive forces due to flow of liquid upwardly through the aperture 63 of support plate 61, and premature separation of the outer ring 3 and inner sleeve 5, the baffles 27 on the flexible segments will direct such flow away from the bottom surface 49 of the inner sleeve 5. Also, to prevent any possible lifting of the inner sleeve 5 from its securement within outer ring 3, the spring clips 53, attached to the outer surface 55 of the flange 45 by attachment means 57, are positioned within the groove 11 about the outer surface 13 of the outer ring 3. Such securement prevents separation of the inner sleeve 5 and outer ring 3 during movement of the shaft 71.

In order to unlock and remove the guide tube flow restrictor 1 from engagement with the upper support plate 61, the assembly procedure is reversed. Spring clips 53 are released from engagement with the groove 11. The inner sleeve 5 is then axially removed from its position within the bore 7 of the outer ring 3, which releases the bias against the flexible members 19, and the outer ring 3 is readily lifted from the support plate. In instances where the inner sleeve 5 and outer ring 3 are not readily separable, such as after possible corrosive buildup, a tool (not shown) may be used to engage the inner sleeve 5 by engagement in the channel 59 in the outer surface 55 of the flange 45 to provide sufficient gripping of the sleeve 5 to permit axial movement of the same relative to the outer ring 3.

In order to reduce the possibility of corrosion or buildup of deposits which could lead to problems in disengagement of the inner sleeve 5 from the outer ring 3 or removal from the support plate 61, the downwardly extending shoulder 37 is provided on the lower surface 39 of the outer ring 3, while the upwardly extending shoulder 41 is provided on the upper surface 43 of the outer ring 3. These shoulders separate the major portion of the lower surface 39 of outer ring 3 from engagement with the upper surface 65 of the support plate, and the major portion of the upper surface 43 of the outer ring 3 from engagement with the flange 45 of the inner sleeve 5. Also, the gap 21, between flexible segments 19 and the inner surface 9 on outer ring 3, about the bore 7, provides for only a point contact between the bottom edge 49 of the inner sleeve 5 and the angular surfaces 35 on struts 33 to preclude buildup of deposits or corrosion that might tend to prevent separation of the inner sleeve 5 and outer ring 3.

As described, the present guide tube flow restrictor does not require the use of tools for assembly, but is self-locking. The device is readily and economically fabricated. In addition, provision is made to reduce the likelihood of corrosive problems or deposit buildup between the outer ring and inner sleeve of the device so as to render the same more readily removable and replaceable.

What is claimed is:

1. A guide tube flow restrictor for use on an upper guide tube housing support plate having an aperture therethrough for passage of a drive shaft, in spaced relationship to the walls of the aperture, comprising:

an outer ring, having an axial bore therethrough and an inner surface facing said bore, seatable on said support plate with the bore thereof coaxial with said aperture;

a flange member on said ring extending inwardly from said inner surface, said flange member having a plurality of flexible segments extending axially through and outwardly from said bore, spaced from said inner surface, each said flexible segment having an inwardly disposed deflecting means thereon; and an inner sleeve, having an outwardly extending flange about the top thereof, axially insertable between said flexible segments, said inner sleeve axially movable from a disengaged position out of contact with said deflecting means to an engaged position to contact said deflecting means and force said flexible segments radially outwardly and frictionally secure the same with the walls of said aperture.

2. A guide tube flow restrictor as defined in claim 1 wherein said flexible segment has an outwardly disposed leg portion at the terminus thereof, which leg portion contacts the bottom wall of said aperture upon radial outward force by said sleeve.

3. A guide tube flow restrictor as defined in claim 2 wherein said outwardly disposed leg portion has an inwardly protruding baffle extending therefrom.

4. A guide tube flow restrictor as defined in claim 1 wherein said inwardly disposed deflecting means comprises an inwardly protruding extension and at least one angular strut extending upwardly therefrom to said flexible segment.

5. A guide tube flow restrictor as defined in claim 4 wherein said angular strut has an angular surface thereon which is contacted by the bottom wall of said inner sleeve to force the flexible segments radially outwardly.

6. A guide tube flow restrictor as defined in claim 1 wherein said outer ring and flange member are an integral unit.

7. A guide tube flow restrictor as defined in claim 1 wherein threads are provided on said outer ring and on said flange member to threadably engage the same together.

8. A guide tube flow restrictor as defined in claim 1 wherein said outer ring has a groove about the outer surface thereof, and the flange of said inner sleeve has locking means thereon engageable with said groove to lock the outer ring and inner sleeve together.

9. A guide tube flow restrictor as defined in claim 1 wherein the flange of said inner sleeve has a channel formed in the outer surface thereof.

10. A guide tube flow restrictor as defined in claim 1 wherein said outer ring has a downwardly extending shoulder completely about the inner periphery of the bottom thereof, which shoulder is seatable on said support plate about said aperture.

11. A guide tube flow restrictor as defined in claim 10 wherein said outer ring has an upwardly extending shoulder completely about the outer periphery of the top thereof, upon which the flange of said inner sleeve rests when the inner sleeve and outer ring are secured together.

12. A guide tube flow restrictor for use on an upper guide tube housing support plate having an aperture therethrough for passage of a drive shaft, in spaced relationship to the walls of the aperture, comprising:
    an outer ring, having an axial bore therethrough and an inner surface facing sid bore, seatable on said support plate with the bore thereof coaxial with said aperture;
    a flange member on said ring extending inwardly from said inner surface, said flange member having a plurality of flexible segments extending axially through and outwardly from said bore, spaced from said inner surface, each said flexible segment having at the terminus thereof an outwardly disposed leg portion, with an inwardly protruding baffle extending from the leg portion, and an inwardly disposed deflecting means comprising an inwardly protruding extension having at least one angular strut thereon extending upwardly therefrom to said flexible segment; and
    an inner sleeve, having an outwardly extending flange about the top thereof, axially insertable between said flexible segments, said inner sleeve axially movable from a disengaged position out of contact with said angular struts to an engaged position to contact said angular struts and force said flexible segments radially outwardly and frictionally secure the same with the walls of said aperture.

13. A guide tube flow restrictor as defined in claim 12 wherein said outer ring and flange member are an integral unit.

14. A guide tube flow restrictor as defined in claim 12 wherein threads are provided on said outer ring and on said flange member to threadably engage the same together.

15. A guide tube flow restrictor as defined in claim 12 wherein said outer ring has a groove about the outer surface thereof, and the flange of said inner sleeve has locking means thereon engageable with said groove to lock the outer ring and inner sleeve together.

16. A guide tube flow restrictor as defined in claim 12 wherein said outer ring has a downwardly extending shoulder completely about the inner periphery of the bottom thereof, which shoulder is seatable on said support plate about said aperture, and an upwardly extending shoulder completely about the outer periphery of the top thereof, upon which the flange of said inner sleeve rests when the inner sleeve and outer ring are secured together.

17. A guide tube flow restrictor as defined in claim 12 wherein the flange of said inner sleeve has a channel formed in the outer surface thereof.

* * * * *

UNITED STATES PATENT OFFICE
CERTIFICATE OF CORRECTION

PATENT NO. : 4,664,879
DATED : May 12, 1987
INVENTOR(S) : Ronald M. Blaushild

It is certified that error appears in the above-identified patent and that said Letters Patent are hereby corrected as shown below:

Cover Page, Item [75]; add:

--Edward J. Rusnica, Greensburg, Pa.--

Signed and Sealed this

Sixth Day of October, 1987

Attest:

DONALD J. QUIGG

*Attesting Officer*   *Commissioner of Patents and Trademarks*